3,780,106
Patented Dec. 18, 1973

3,780,106
PROCESS FOR PREPARING 5-(γ-TERTIARYAMINO-PROPYLIDENE-DIBENZO[a,d]CYCLOHEPTENES
David Taub and Robert D. Hoffsommer, Jr., Metuchen, N.J., assignors to Merck & Co., Inc., Rahway, N.J.
No Drawing. Continuation of abandoned application Ser. No. 837,359, June 27, 1969. This application June 29, 1972, Ser. No. 267,348
Int. Cl. C07c 87/28
U.S. Cl. 260—570.8 TC         2 Claims

ABSTRACT OF THE DISCLOSURE

5 - (γ - tertiaryaminopropylidene) - dibenzo[a,d]cycloheptenes, such as amitriptyline or cyclobenzaprine are prepared via a Grignard reaction with a 5-N-alkylimino-5H-dibenzo[a,d]-10,11-dihydrocycloheptene alkiodide salt or 5-N-alkylimino-5H-dibenzo[a,d]cycloheptene alkiodide salt. These latter intermediates are prepared from 10,11-dihydro-5H-dibenzo[a,d]cyclohepten-5-one or the corresponding 10,11-unsaturated compound by reaction with an alkylamine to yield the corresponding alkylimine which is then treated with an alkyliodide. The compounds of the present invention are useful as antidepressants or tranquilizers in the treatment of mental disorders.

DESCRIPTION OF THE PRIOR ART

This is a continuation of application Ser. No. 837,359, filed June 27, 1969, and now abandoned.

The compounds of the present invention are known in the art (U.S. Pat. 3,428,375).

In the process of the prior art these compounds are prepared by Grignard reaction of the corresponding dibenzo[a,d]cyclohepten - 5 - one with a dialkylaminoalkyl Grignard reagent followed by hydrolysis and dehydration. The dehydration step must be carried out under mild conditions in order to avoid undesirable side reactions. The method of the art requires treatment with dilute hydrochloric acid for a period of approximately 20 hours at ambient temperature. In order to facilitate the commercial synthesis of the compound of the present invention a method would be desirable which would eliminate the need for a 20 hour step in the reaction sequence.

SUMMARY OF THE INVENTION

In the process of the present invention, there is utilized as starting material 10,11-dihydro-5H-dibenzo[a,d]cyclohepten-5-one or a derivative thereof having a halogen substituent in one of the six membered rings (Formula I).

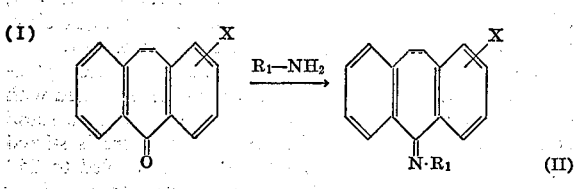

The ketone (I) is then treated with an alkylamine (or aralkylamine). The 5-alkylimine thus produced (II) is then treated with a quarternizing agent $R_2Q$, any quarter- nizing agent may be employed; however, loweralkylhalides of 1 to 5 carbon atoms are preferred.

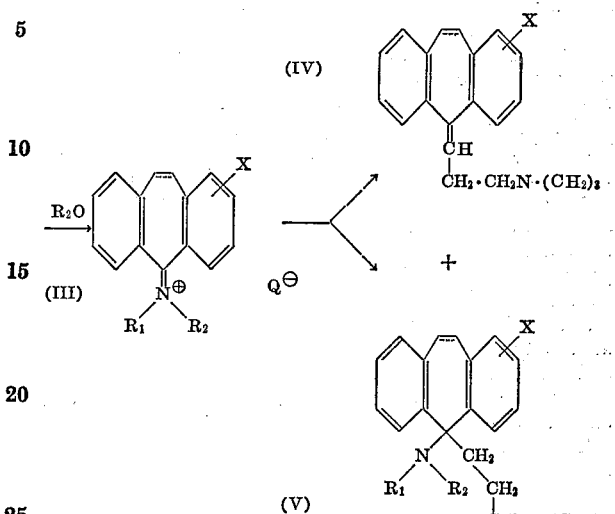

The thus produced dialkylamine halide quaternary salt (III) is then treated with dimethylaminopropyl magnesium halide to yield the desired dimethylaminopropylidene Compound IV. In the foregoing reaction scheme $R_1$ is alkyl or aralkyl, $R_2$ is alkyl, Q and X are halogen, and the broken lines indicate an optional double bond.

It is the surprising finding of the present invention that contrary to expectation it is not necessary to take any specific steps to convert the Grignard complex into the desired product. The ordinary work up procedures utilized in the art for the isolation of the desired products of Grignard reagents will cause the elimination of a dialkylamine moiety to give the desired dialkylaminopropylidene substituted product (IV), and as a by-product there is obtained the 5-(dialkylamino)-5-(dimethylaminopropyl)-compound (V). The desired propylidene derivative (IV) may be readily separated from the by-product (V) by chromatography on silica gel.

DESCRIPTION OF THE PREFERRED EMBODIMENTS

In the preferred modification of the invention, the starting material, 10,11-dihydro-5H-dibenzo[a,d]cyclohepten-5-one, 5H-dibenzo[a,d]cyclohepten-5-one or a derivative thereof having a halo substituent such as fluoro, bromo or iodo in one of the six membered rings is taken up in a suitable dry, inert solvent suitably a substantially non-polar oxygenated organic solvent such as diethyl ether, tetrahydrofuran, or the like and a primary amine added thereto. There may be utilized alkylamines or aralkylamines, suitably a lower alkylamine having from 1 to 5 carbon atoms in the alkyl moiety such as methylamine, ethylamine, isopropylamine, butylamine, sec butylamine and the like. Preferred among these amines are the branch chain alkylamines. Also suitable in this reaction are aralkylamines suitably aryl lower alkylamines such as benzylamine, phenethylamine, phenylbutylamine, and the like.

The reaction mixture is isolated from air and moisture, suitably placing it in an atmosphere of dry nitrogen and the mixture is then cooled suitably by means of an ice bath to a temperature of between 0° and 20° C. suitably to about 10° C. There is then added slowly, suitably drop-wise, with agitation, a solution of titanium tetrachloride in a reaction inert organic solvent suitably a hydrocarbon solvent such as hexane. It is preferred to use a fairly substantial molar excess of amine over ketone say from about 2 to about 4 moles of amine per mole of ketone and approximately ½ mole of titanium tetrachloride per mole of ketone. After completion of the addition, the reaction mixture is heated under reflux, and the product isolated.

In the preferred isolation and purification procedure the cooled reaction mixture is filtered, the filter cake washed with a suitable solvent, such as ether, and the combined filtrate and washings evaporated in vacuo to yield a residue which upon recrystallization, suitably from petroleum ether, yields the desired alkylimine (II).

The imine (II) is then quarternized suitably with a lower alkyl iodide, such as methyl iodide, ethyl iodide or the like. In this procedure, the imine is taken up in a suitable reaction inert, dry, organic solvent, such as benzene or the like, and treated with a substantial excess, of the alkyl halide. An excess of between 10 and 20 moles per mole of imine is suitable. The reaction mixture is warmed gently, say to between 30° and 40°, depending on the alkyl halide utilized, for a period of between about 8 to about 18 hours, cooled to ambient temperature, and the product isolated. Suitably the product is isolated by filtration, and washing of the resultant residue with ether to yield the desired quarternary salt (III).

There is then prepared a Grignard reagent of 3-N-dimethylaminopropyl halide, suitably a Grignard reagent of 3-N-dimethylaminopropyl chloride, although the corresponding bromide or iodide can also be used. The solution may be prepared in diethyl ether or tetrahydrofuran, although the latter is preferred. There is then prepared a slurry of the quarternary salt (III) in a peroxide free ether, suitably in tetrahydrofuran, in an anhydrous atmosphere, suitably in a dry nitrogen atmosphere. To this rapidly stirred slurry there is added a substantial excess of the aforementioned Grignard reagent. Suitably an excess of between 5 and 15 moles of Grignard reagent per mole of quarternary salt may be utilized. After addition is complete the reaction mixture is heated under reflux for from about 2 to about 6 hours, cooled, and the product isolated. In the preferred isolation procedure, the reaction mixture is filtered to remove the white residual solid, and then washed with tetrahydrofuran and ether and the combined filtrate and washing hydrolyzed by careful addition of water to destroy the excess Grignard reagent. The reaction mixture is then treated with more water and extracted with suitable water immiscible organic solvent. While solvents such as hexane, petroleum ether, benzene, methylene chloride, chloroform, or diethyl ether, may be utilized, it has been found preferable to utilize 1:1 mixture of methylene chloride and diethyl ether. Organic extracts are combined, washed, dried, and evaporated to dryness to yield an oil which is then subjected to dry column chromatography suitably on silica gel. Elution of the column yields separate fractions, a desired 3-dimethylaminopropylidene derivative as well as the 3-dimethylaminopropyl dimethylalkylamino derivative by-product. The desired 3-dimethylamino-propylidene derivative is then further purified, suitably by formation of the hydrochloride followed by recrystallization from a suitable solvent.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

EXAMPLE 1

5H-dibenzo[a,d]-10,11-dihydrocyclohepten-5-N-isopropylimine

A mixture of 10.0 g. of 5H-dibenzo[a,d]-10,11-dihydrocyclohepten-5-one and 8.9 g. of isopropylamine are dissolved in 30 ml. of dry diethyl ether and placed in a reaction vessel under dry nitrogen. The reaction mixture is cooled to ca. 10° C. and there is added, drop-wise with stirring, thereto a solution of 4.8 g. of titanium tetrachloride in 20 ml. of hexane. The reaction mixture is allowed to warm to ambient temperature and stirred for 30 minutes, heated under reflux for 75 minutes, and stirred at ca. 30° C. for 15 hours. The mixture is then filtered through celite and the filter cake washed with ether. The combined filtrate and washings are evaporated in vacuo to yield a solid residue. Recrystallization from petroleum ether yields 5H - dibenzo[a,d] - 10,11-dihydrocyclohepten-5-N-isopropylimine (M.P. 75–78° C.).

In accordance with the foregoing procedure but starting with 5H-dibenzo[a,d]-3-chloro - 10,11 - dihydrocyclohepten - 5 - one, or 5H - dibenzo[a,d] - 1 - bromo - 10,11-dihydrocyclohepten - 5 - one in place of 5H-dibenzo[a,d]-10,11-dihydrocyclohepten-5-one there is obtained the corresponding 5H-dibenzo[a,d]-3-chloro - 10,11 - dihydrocyclohepten-5-N-isopropylimine, and 5H-dibenzo[a,d]-1-bromo-10,11-dihydrocyclohepten-5-N-isopropylimine.

In accordance with the foregoing procedure but starting with 5H-dibenzo[a,d]cyclohepten - 5 - one, 5H-dibenzo-[a,d]-3-chloro-cyclohepten-5-one, or 5H-dibenzo[a,d]-1-bromo-cyclohepten-5-one in place of 5H-dibenzo-10,11-dihydro-[a,d]-cyclohepten-5-one there is obtained the corresponding 5H - dibenzo[a,d]cyclohepten-5-N-isopropylimine, 5H-dibenzo[a,d]-3-chloro-cyclohepten - 5 - N-isopropylimine, and 5H-dibenzo[a,d]-1-bromo-cyclohepten-5-N-isopropylimine.

In accordance with the foregoing procedures but in place of isopropylamine, utilizing ethylamine, tertbutylamine, and pentylamine, there is obtained the corresponding 5H-dibenzo[a,d]-5-N-ethylimino-10,11-dihydrocyclo-
  heptene,
5H-dibenzo[a,d]-5-N-tertbutylimino-10,11-dihydro-
  cycloheptene,
5-dibenzo[a,d]-10,11-dihydrocyclohepten-5-N-
  pentylimine,
5H-dibenzo[a,d]-5-N-ethylimino-cycloheptene,
5H-dibenzo[a,d]-5-N-tertbutylimino-cycloheptene, and
5-dibenzo[a,d]cyclohepten-5-N-pentylimine.

EXAMPLE 2

5H-dibenzo[a,d]-10,11-dihydrocyclohepten-5-N-isopropylimine methiodide salt

A solution of 1.0 g. of 5H-dibenzo[a,d]-10,11-dihydrocyclohepten-5-N-isopropylimine in 4 ml. of dry benzene is treated with 4 ml. of methyl iodide and the mixture allowed to stand at 35° C. for 14 hours. The resultant mixture is stirred vigorously and the thus obtained slurry is cooled to 25° C., filtered, and the residue washed with ether and air dried to yield 5H-dibenzo[a,d]-10,11-dihydrocyclohepten-5-N-isopropylimine methiodide salt.

A solution of 1.0 g. of 5H-dibenzo[a,d]-cyclohepten-5-N-isopropylimine in 4 ml. of dry benzene is treated with 4 ml. of methyl iodide and the mixture allowed to stand at 35° C. for 14 hours. The resultant mixture is stirred vigorously and the thus obtained slurry is cooled to 25° C., filltered and the residue washed with ether and air dried to yield 5H-dibenzo[a,d]-cyclohepten-5-N-isopropylimine methiodide salt.

In accordance with the foregoing procedure but in place of methyl iodide, utilizing ethyl iodide, propyl iodide or butyl iodide there are obtained the corresponding ethiodide, propyliodide, and butyliodide quarternary salts.

EXAMPLE 3

5-(3-dimethylaminopropylidene)-5H-dibenzo[a,b]-10,11-dihydrocycloheptene

To a solution of 1.29 g. of 5H-dibenzo[a,d]-10,11-dihydrocyclohepten-5-N-isopropylimine methiodide in 90 ml. of dry tetrahydrofuran is added a freshly prepared solution of 3-dimethylaminopropyl magnesium chloride prepared from 4 g. of 3-dimethylaminopropyl chloride, in 28 ml. of dry peroxide free tetrahydrofuran. The Grignard solution is added dropwise while the methiodide suspension is rapidly stirred in a dry nitrogen atmosphere. The reaction mixture is stirred and heated under reflux for 4.5 hours, cooled to room temperature, and filtered, still under nitrogen. The filter pad is washed with tetrahydrofuran and ether, and the combined filtrate and washings treated with 5 ml. of water added in dropwise manner. The reaction mixture is then treated with 80 ml. of water, and extracted with a 1:1 mixture of methylene chloride/ether. The combined extracts are washed with saturated aqueous sodium chloride solution dried over anhydrous sodium sulfate and evaporated to dryness to yield a mixture of 5-(3-dimethylaminopropylidene)-5H-dibenzo[a,d] - 10,11 - dihydrocycloheptene and 5-(3-dimethylaminopropyl)-5-(N - methyl - N - isopropylamino)-5H-dibenzo[a,d]-10,11-dihydrocycloheptene.

The mixture is then subjected to dry column chromatography on silica gel. Elution with benzenecyclohexane (1:1) yields pure 5-(3-dimethylaminopropylidene)-5H-dibenzo[a,d]-10,11-dihydrocycloheptene.

The product is taken up in ethyl ether and treated with ethyl ether saturated with dry hydrogen chloride. The supernatant liquid is removed, the residue dried under a stream of dry nitrogen, and triturated with ethyl ether to yield a crystalline precipitate which is filtered, and washed with ethyl ether to yield 5-(3-dimethylaminopropylidene)-5H - dibenzo[a,d]-10,11-dihydrocycloheptene hydrochloride (M.P. 196–197° C.).

The procedure is repeated using 1.29 g. of 5H-dibenzo[a,d]cyclohepten-5-N-isopropylimine methiodide and employing stoichiometrically equivalent quantites of reagents and solvents to produce 5-(3-dimethylaminopropylidene)-5H-dibenzo[a,d]cycloheptene.

The 3-dimethylaminopropyl magnesium chloride is prepared in the usual manner by reacting 4.0 g. of 3-dimethylaminopropyl chloride and 0.8 g. of magnesium turnings in 28 ml. of dry peroxide free tetrahydrofuran in a nitrogen atmosphere.

What is claimed is:

1. A process for the preparation of a 5-tertiaryaminoalkylidene dibenzocycloheptadiene of the formula

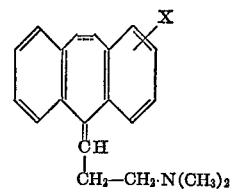

which consists of reacting a quarternary imino salt of the formula

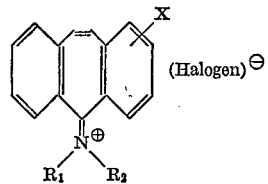

wherein
$R_2$ is loweralkyl,
$R_1$ is loweralkyl or aryl lower alkyl wherein the alkyl moiety contains from 1 to 5 carbon atoms,
X is hydrogen or halogen, and the broken line indicates an optional double bond, with a dimethylaminopropyl magnesium halide.

2. The process according to claim 1 in which 5H-dibenzo[a,d]-10,11-dihydrocyclopenten - 5 - N - isopropyliminemethiodide is reacted with dimethylaminopropyl magnesium chloride to produce 5-(3-dimethylaminopropylidene)-5H-dibenzo[a,d]-10,11-dihydrocycloheptene.

References Cited
UNITED STATES PATENTS 3,494,935   2/1970   Christy _____ 260—570.8 X ROBERT V. HINES, Primary Examiner U.S. Cl. X.R.

260—566 R